May 16, 1967  B. B. BOND ET AL  3,319,334
INNER CUTTER MOUNTING FOR POWER SHAVERS
Original Filed Oct. 14, 1963
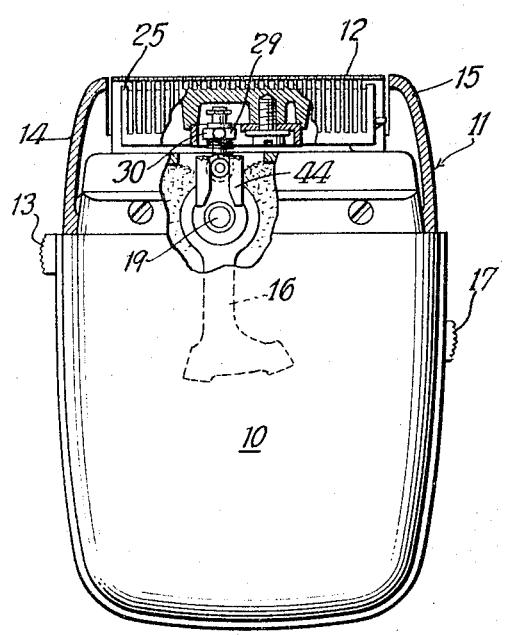
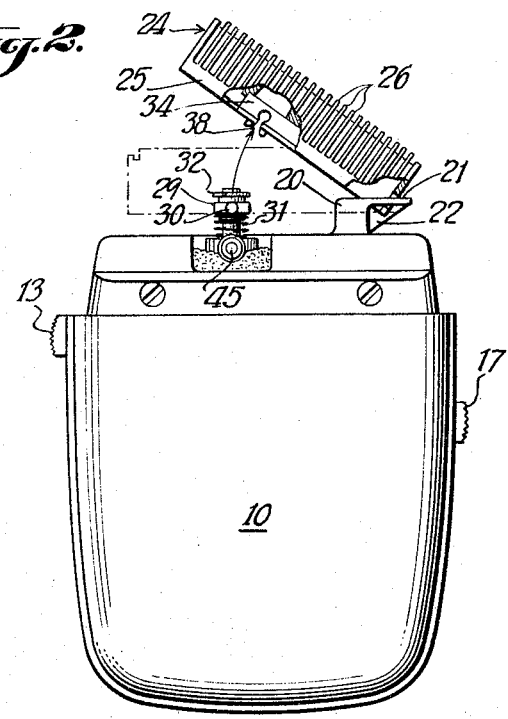
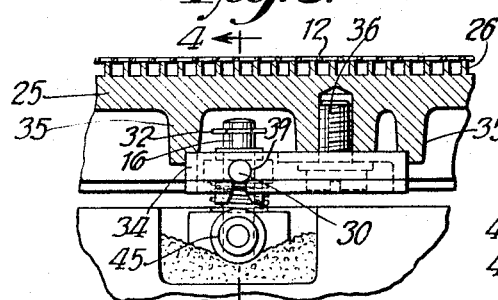
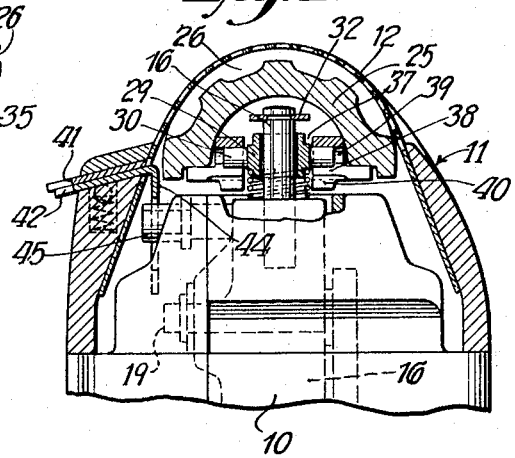
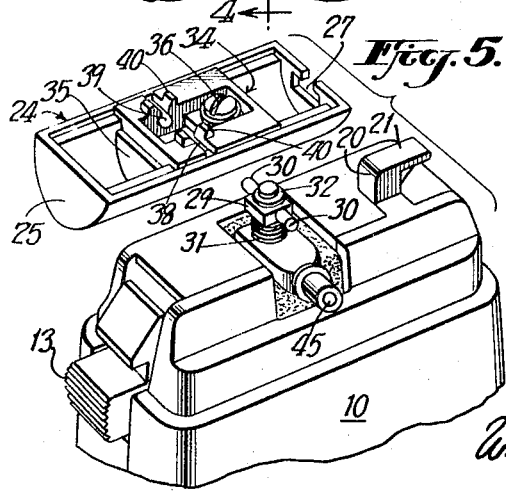
INVENTORS.
BEVERLY B. BOND.
JAMES SCHNAPP
BY
ATTORNEYS.

United States Patent Office 3,319,334
Patented May 16, 1967

3,319,334
INNER CUTTER MOUNTING FOR POWER SHAVERS
Beverly B. Bond, South Norwalk, Conn., and James Schnapp, Bronx, N.Y., assignors to Ronson Corporation, Woodbridge, N.J., a corporation of New Jersey
Original application Oct. 14, 1963, Ser. No. 316,095. Divided and this application May 9, 1966, Ser. No. 554,263
6 Claims. (Cl. 30—43.92)

The present application is a divisional application of copending application Ser. No. 316,095 filed Oct. 14, 1963, which is, in turn, derived in part from application Ser. No. 247,476 filed Dec. 24, 1962, and abandoned after the filing of said application Ser. No. 316,095. Application Ser. No. 247,476 is, in turn, a continuation application of application Ser. No. 14,818 filed Mar. 14, 1960, and abandoned after the filing of said application Ser. No. 247,476.

The invention relates to power driven shavers of the type employing an exceedingly thin and freely flexible head plate which serves as a stationary cutter, and which partially envelopes a reciprocating movable cutter, the head plate being conformable in contour to the movable cutter and the cutters being urged by spring pressure into contact with each other. In shavers of the above type it is important to efficient cutting action that the active portions of the cutter be maintained in exceedingly close and precise enegagement with each other throughout the area of cut and in all positions of the movable cutter throughout its stroke. In one of its aspects the invention aims to provide a mounting and driving structure for the movable cutter which will more effectively insure that such intimate and precise engagement between the cutters is maintained throughout the stroke of the movable cutter.

In another aspect the invention aims to provide a mounting for the movable cutter which will afford more facile attachment and detachment of the movable cutter for purposes of installation, servicing, or replacement, to the end that the cutter may be readily installed in proper operating position, or detached therefrom, without requiring special skills or tools. Further objects and advantages of the invention will be in part obvious and in part specifically referred to in the description hereinafter contained which, taken in conjunction with the accompanying drawings, discloses a preferred form of cutter mounting structure constructed to operate in accordance with the invention; the disclosure however should be regarded as merely illustrative of the invention in its broader aspects. In the drawings:

FIG. 1 is an elevational view of a power driven shaver, partly broken away, illustrating an embodiment of the mounting and driving structure of the present invention;

FIG. 2 is a view similar to FIG. 1 but with the stationary cutter removed and with the movable cutter shown in full lines disconnected from the driving mechanism, and in dot dash lines in its normal operation position;

FIG. 3 is an enlarged view of that portion of FIG. 1 which illustrates the mounting and driving structure of the present invention;

FIG. 4 is a sectional view taken along the line 4—4 of FIG. 3; and

FIG. 5 is a composite perspective view illustrating the upper portion of a power shaver with the movable cutter disconnected therefrom and inverted.

Referring now to FIGS. 1 and 4 of the drawing, there is shown a power shaver comprising a casing 10, a hollow head frame 11 mounted at the upper end of the casing and a bowed, flexible shear plate 12 which is appropriately secured to the head frame 11 in position between opposed end walls 14 and 15 thereof. This shear plate 12 constitutes the stationary cutter and may comprise an exceedingly thin and resilient metal plate as already known in the art. A depressible latch 13 (FIGS. 1, 2 and 5) releasably holds the head frame 11 in position.

The power shaver is also provided with an appropriate motor (not shown) within the casing 10 for oscillating a rocker arm 16 and a switch 17 is provided for turning the power on and off. The rocker arm 16 is mounted to swing about a stud 19 conveniently supported within the casing.

As shown in FIGS. 2 and 5, a stop member 20 extends upwardly from the upper portion of the casing at one side thereof and has a tongue 21 extending outwardly of the upper end thereof, and a web 22 (FIG. 2) may be provided for reinforcing the tongue.

The movable cutter 24 is provided with a hollow base 25 having a series of spaced, arcuately shaped cutting blades 26 anchored therein, and also has a T-shaped opening 27 in one end thereof for reception of the tongue 21 of the stop member 20. The parts 20–22 are inactive during normal operation, but when the head frame 11 and shear plate 12 are removed, these parts act as stops preventing angular movement of the movable cutter too far from the position it will have to assume when the head frame is replaced to its normal position. Thus the parts 20–22 prevent injury to the shear plate 12 such as might occur if the user should undertake to restore the head frame to normal position, with the movable cutter too much out of alinement with the normal position of the shear plate 12.

As shown in FIGS. 1 and 4, the rocker arm 16 extends upwardly beyond the stud 19 and into the hollow of the base 25 of the movable cutter 24. A trunnion member 29 is mounted in the upper end of the arm 16 so as to be free for sliding and turning movements with respect to the arm, and is provided with a pair of oppositely directed trunnions 30. A spring 31 surrounds the arm 16 and urges the trunnion member 29 upwardly toward a stop washer 32.

A trunnion bearing member 34 is mounted within the hollow of the movable cutter 24 between a pair of transverse internal walls 35 and is held in place by a screw 36. Bearing member 34 has recess 37 therein to loosely receive the trunnion member 29 when the parts are in assembled relation, and also has a pair of alined sockets 39 opening downwardly thereof through restricted slots 38 which are somewhat less in width than the diameter of the trunnions 30 so that the trunnions may be sprung into the sockets 39. The member 34 may also be conveniently formed with a plurality of lugs 40 having opposed surfaces tapering inwardly towards the slots 38 for guiding the trunnions 30 into seating engagement with the sockets 39. The trunnion and bearing members or at least one of them, are formed of elastically distortable material such as molded plastic having inherent resilience, to enable the trunnions to be sprung into and out of engagement with the sockets 39. A suitable material for such purpose is an acetal resin commercially known as "Delrin." To mount the movable cutter in working position it is simply necessary to slip the T-slot 27 over the stop 20 and position the trunnions opposite the mating slots 38 in the bearing member 34 and then push firmly on the cutter in a direction toward the casing 10 to snap the trunnions into position in sockets 39. To remove the movable cutter the end thereof remote from the guide 20 may be pulled upwardly in a direction away from the casing 10.

When the movable cutter is thus mounted for operation, the spring 31 urges it upwardly towards the flexible plate 12 so that the curvature of the flexible plate conforms to that of the arcuate blades 26 especially in the area where the plate is pushed against the surface of skin to be shaved.

It is important to note that, while we have illustrated and described the trunnion member 29 as being mounted on the arm 16 and the bearing member 34 as being mounted in the hollow of the movable cutter 24, it is within the concept of the present invention to reverse this arrangement and to mount the trunnions on the movable cutter and the bearings on the arm 16 and, in fact, a single trunnion may be used which is mounted, for example in the base of the movable cutter and a single bearing mounted on the arm 16 may engage the intermediate portion of such single trunnion.

Some of the power shavers presently available embody a longer hair trimming assembly located at one side of the head frame. As shown in FIG. 4, the present invention need not interfere with such a feature. The trimming assembly includes a stationary blade 41 and a reciprocating blade 42. The oscillating blade has a downwardly extending forked tongue 44 that extends through an opening in the shear plate 12 to engage a driving stud 45 when the head frame is mounted in one position on the casing. The driving stud is connected to the rocker arm 16 and thereby transmits reciprocating movement to the trimmer blade 42. When the head frame is reversed so that the trimming assembly is disposed on the side of the casing opposite the stud 45, the movable trimming blade will remain motionless thereby permitting the full power of the motor to be delivered to the main cutter 24.

The above described mounting and driving structure for the movable cutter affords limited angular movement of the cutter about the arm 16 as an axis, to the extent permitted by the stop member 20, 21 which is received loosely within the slot 27; and said structure also permits limited angular movement of the movable cutter about the trunnions 30 as an axis, to the extent permitted by the stop member above mentioned The above limited freedom of the movable cutter, especially when used in conjunction with a readily flexible shear plate 12, affords exceedingly close and precise conformance between the engaging surfaces of the movable and stationary cutters, particularly under the pressure applied by the spring 31.

It is highly important to effective shearing action by the cutters that this exceedingly close conformance be maintained in all positions of the movable cutter throughout its stroke, and it has been found that the mounting and driving structures heretofore used in shavers of the type herein disclosed, have been prone to produce small clearance between portions of the movable cutter and the adjacent portions of the shear plate 12, particularly when the movable cutter is near the opposite limits of its stroke. These clearances although microscopic have resulted in less effective shearing action of the movable cutter when near the opposite limits of its stroke, in other words the play or relative motion afforded between the movable cutter and the oscillating arm which drives it, as afforded by such prior structures, was not of a character which insured close conformance throughout, of the movable cutter with respect to the stationary shearing plate, during all phases of the stroke of the movable cutter. The above described mounting and driving structure for the movable cutter on the other hand provides definitely controlled pivotal rocking movements of the movable cutter with respect to the rocker arm 16, about the trunnions 30 as an axis, and it has been found that this controlled pivotal motion adjustment during the stroke of the movable cutter, in conjunction with the accompanying sliding movements of the movable cutter and immediately associated parts, back and forth along the rocker arm 16 under the pressure of the spring 31, is such as to result in exceedingly close engagement and conformance throughout of the movable cutter with respect to the shear plate 12, in all positions which the movable cutter assumes during its stroke. In other words the erratic positioning of the movable cutter with respect to the stationary cutter, as found in respect to earlier shavers of the type under discussion, has been substantially eliminated by the cutter mounting and driving structure herein disclosed.

While the invention has been disclosed as carried out by a structure of the above described specific form, it should be understood that changes may be made therein without departing from the invention in its broader aspects, within the scope of the appended claims.

We claim:

1. In a power shaver, an oscillating rocker arm, a movable cutter disposed adjacent said arm, a stationary cutter overlying said movable cutter, and means for reciprocating said movable cutter in close engagement with the stationary cutter, said means comprising a trunnion member and a bearing member interposed in series between said arm and said movable cutter, said bearing member having a socket therein in which a trunnion carried by said trunnion member is pivotally engaged.

2. In a power shaver, an oscillating rocker arm, a movable cutter disposed adjacent said arm, a stationary cutter overlying said movable cutter, and means for reciprocating said movable cutter in close engagement with the stationary cutter, said means comprising a trunnion member and a bearing member interposed in series between said arm and said movable cutter, said bearing member having a socket therein in which a trunnion carried by said trunnion member is pivotally engaged, at least one of said members including elastic deformable material affording snap engagement and disengagement of said trunnion into and out of said socket.

3. In a power shaver, an oscillating rocker arm, a movable cutter disposed adjacent said arm, a stationary cutter overlying said movable cutter, and means for reciprocating said movable cutter in close engagement with the stationary cutter, said means comprising a trunnion member and a bearing member interposed in series between said arm and said movable cutter, said bearing member having a socket therein in which a trunnion carried by said trunnion member is pivotally engaged, said means for reciprocating the movable cutter including parts affording movements of said movable cutter longitudinally of said arm during reciprocation of the movable cutter, and a spring urging said movable cutter into engagement with the stationary cutter.

4. In a power shaver, a casing, an oscillating rocker arm mounted within said casing, a head frame detachably engaging said casing, a shear plate carried by said head frame in position to overly said rocker arm, a reciprocatory movable cutter interposed between said shear plate and rocker arm, and means for reciprocating said movable cutter in close engagement with said shear plate, said means comprising a trunnion member and a bearing member interposed in series between said arm and said movable cutter, said bearing member having a socket therein in which a trunnion carried by said trunnion member is pivotally engaged, at least one of said members including elastic deformable material affording snap engagement and disengagement of said trunnion into and out of said socket, one of the aforesaid members being carried by said movable cutter to afford detachment thereof along with the movable cutter when said trunnion is disengaged from said socket, and the other of said members being carried by said arm to remain in place thereon when said movable cutter is detached as aforesaid.

5. In a power shaver, a casing, an oscillating rocker arm mounted within said casing, a head frame detachably engaging said casing, a shear plate carried by said head frame in position to overly said rocker arm, a reciprocatory movable cutter interposed between said shear plate and rocker arm, and means for reciprocating said movable cutter in close engagement with said shear plate, said means comprising a trunnion member and a bearing member interposed in series between said arm and said movable cutter, said bearing member having a socket therein in which a trunnion carried by said trunnion member is pivotally engaged, at least one of said members including elastic deformable material affording snap engagement and disengagement of said trunnion into and out of said socket, one of the aforesaid members being carried by said movable cutter and the other of said members being slidably engaged with said arm to afford movement thereof longitudinally of the arm during oscillation of said arm, and a spring urging said members and said movable cutter toward a position in which said movable cutter closely engages said shear plate.

6. In a power shaver, a casing, an oscillating rocker arm mounted within said casing, a head frame detachably engaging said casing, a shear plate carried by said head frame in position to overly said rocker arm, a reciprocatory movable cutter interposed between said shear plate and rocker arm, and means for reciprocating said movable cutter in close engagement with said shear plate, said means comprising a trunnion member slidably and turnably caried by said arm and having alined trunnions extending therefrom, a bearing member fixed to said movable cutter and having alined sockets positioned to respectively receive said trunnions in pivotal relation thereto, at least one of said members including elastic deformable material affording snap engagement and disengagement of said trunnions into and out of said sockets and a spring urging said members and movable cutter into a position in which said movable cutter closely engages said shear plate.

References Cited by the Examiner
UNITED STATES PATENTS

| 2,228,663 | 1/1941 | Knapp | 30—43 X |
| 2,302,882 | 11/1942 | Ohlendorf | 287—103 X |
| 2,304,909 | 12/1942 | Hanley | 30—43.7 |
| 2,331,500 | 10/1943 | Rand | 30—43.7 |
| 2,873,520 | 2/1959 | Schnapp et al. | 30—34 |

WILLIAM FELDMAN, *Primary Examiner.*

MYRON C. KRUSE, *Examiner.*